(12) United States Patent
Miller et al.

(10) Patent No.: US 6,935,769 B2
(45) Date of Patent: Aug. 30, 2005

(54) APPARATUS FOR PRODUCTION OF STRIATED, LAMINATED LIPID-BASED CONFECTIONS

(75) Inventors: Van Miller, Norval (CA); Rene Miller, Guelph (CA)

(73) Assignee: Cargill Limited, Winnipeg (CA)

(*) Notice: Subject to any disclaimer, the term of this patent is extended or adjusted under 35 U.S.C. 154(b) by 21 days.

(21) Appl. No.: 10/066,595

(22) Filed: Feb. 6, 2002

(65) Prior Publication Data

US 2003/0148000 A1 Aug. 7, 2003

(51) Int. Cl.[7] .............................. B01F 5/04; B01F 15/02
(52) U.S. Cl. ................................ 366/174.1; 366/182.2; 366/340
(58) Field of Search ...................... 366/167.1, 173.1, 366/174.1, 175.2, 179.1, 181.8, 182.3, 303, 315–317, 336, 340, 182.2; 426/519

(56) References Cited

U.S. PATENT DOCUMENTS

| | | | | |
|---|---|---|---|---|
| 1,496,345 A | * | 6/1924 | Lichtenthaler | 366/165.2 |
| 2,000,953 A | * | 5/1935 | Hooker et al. | 366/339 |
| 2,169,338 A | * | 8/1939 | Ditto | 366/303 |
| 2,516,436 A | * | 7/1950 | Walker | 366/139 |
| 3,604,690 A | * | 9/1971 | Traelnes | 366/303 |
| 4,068,830 A | * | 1/1978 | Gray | 366/175.2 |
| 4,792,238 A | * | 12/1988 | Yoneyama et al. | 366/307 |
| 5,354,572 A | | 10/1994 | Miller et al. | |
| 5,356,643 A | | 10/1994 | Miller et al. | |
| 5,375,510 A | | 12/1994 | Miller et al. | |
| 5,431,945 A | * | 7/1995 | Miller et al. | 426/580 |
| 5,447,735 A | | 9/1995 | Miller | |
| 5,480,597 A | * | 1/1996 | Ishida et al. | 264/40.4 |
| 5,672,373 A | * | 9/1997 | Miller | 426/588 |
| 6,368,655 B1 | * | 4/2002 | Miller et al. | 426/631 |

FOREIGN PATENT DOCUMENTS

| | | |
|---|---|---|
| CH | 654 490 A5 * | 2/1986 |
| EP | 0 705 641 A2 * | 10/1995 |

* cited by examiner

*Primary Examiner*—David Sorkin
(74) *Attorney, Agent, or Firm*—Marks & Clerk; Richard J. Mitchell

(57) ABSTRACT

A method of manufacturing multi-layered, laminated, lipid-based sweet confections comprises tempering the lipid-based formulation for each layer, and depositing them separately onto a moving conveyor belt, which is passed through a cooling tunnel between the station where the first layer is placed on the conveyor belt and the station where the next layer is placed. If more than two layers are to be made, additional stations are employed further along the conveyor belt. A set of fingers is located at each station so as to striate the layers as they pass beneath the fingers, so as to govern the width of each ribbon that is thus formed. The width of the fingers in each successive set of fingers is not greater than the width of the fingers in the preceding set. A mixer is arranged with a pump to inject discrete predetermined quantities of a syrup additive which at least has a color component and which may also have a flavour component, into the center of a stream of tempered formulation for at least one of the layers as it is being fed into the mixer, so that upon exit from the mixer the formulation has at least a different color than the formulation for each contiguous layer of the confection being formed.

8 Claims, 2 Drawing Sheets

APPARATUS FOR PRODUCTION OF STRIATED, LAMINATED LIPID-BASED CONFECTIONS

FIELD OF THE INVENTION

This invention relates to multi-layered, laminated, lipid-based sweet confections. The sweet confections are lipid-based, typically chocolate but not necessarily, and may be employed either as snack items or in baked items such as cookies and cakes. Depending on the formulations employed, the laminated, multi-layered sweet confections of the present invention may also be incorporated into ice cream confections.

BACKGROUND OF THE INVENTION

Sweet or flavoured lipid-based confections and baked goods additives are well known. For example, the present inventors—or at least one of them—are the inventors in the following United States Patents, all of which relate to lipid-based flake or chip products, or confections, which can be incorporated into baked goods:

U.S. Pat. No. 5,354,572 Dry Butter-Based Flake Product.

U.S. Pat. No. 5,447,735 Sweet Cinnamon or Other Flavored Fat-Based, and Hydrous Flakes for Bakery Purposes.

U.S. Pat. No. 5,356,643 Cheese-Based Dry Flake Products and Snack Items and Processes for Producing the Same.

U.S. Pat. No. 5,375,510 Dry Butter Flake Product Having High Milk Solid Content.

None of the above patents, however, relates to laminated or multi-layered, lipid-based products. Indeed, only U.S. Pat. No. 5,447,735 teaches a confection product which is lipid-based and sugar-based at the same time.

Several attempts by others to manufacture multi-layered lipid-based confections are known to the inventors to have been attempted, but those prior attempts have been not successful, especially on a commercial scale, because they have involved an attempt to create a layered confection by placing one layer of lipid-based formulation over another layer of lipid-based formulation at the same time and at the same station.

The present inventors have quite unexpectedly discovered that they can manufacture striated or ribbon-like, multi-layered confections of lipid-based formulations manufactured on a commercial scale, where any two contiguous layers have at least different colors and may also have different flavours, by placing a first layer at a first station and a second layer at a second station after the first layer has begun to re-crystallize by being passed through a cooling tunnel. What effectively happens is that the first layer has begun to re-crystallize, and its upper surface, as it has been placed on a conveyor belt, is somewhat tacky so that the second layer will adhere to the first layer when it is placed thereon.

Of course, the present invention can be extended to more than two layers, such as to a three or four layer, lipid-based, confection.

One feature of the present invention is that the confections are striated so as to become ribbon-like. Moreover, the width of the first or bottom layer may be slightly less than the width of any subsequent layer which is placed thereon. This accommodates the method and apparatus to be described hereafter, by which the ribbons are formed by being passed under sets of pluralities of fingers, but the width of the fingers may reduce from station to station along the cooling tunnel/conveyor belt assembly. The reason for that is that as the lipid-based formulation of the then currently placed layer is being sheared as it is extruded through the plurality of fingers so as to continue to form the ribbon-like confection, the layer beneath it will already have started to crystallize, and a shearing action along the edge of the ribbon as it is being formed and as it has started to crystallize will be detrimental to the integrity of the structure.

Typically, but not necessarily, at least one of the layers of the multi-layer, laminated, lipid-based confections in keeping with the present invention is formed of chocolate, or is chocolate-based. Other layers, or all of the layers, may otherwise be sweetened lipid-based formulations, all of which typically have a tempering temperature in the range of 40° C. to 90° C., but all of which are substantially solid at room temperature. The solid fat index curve characteristic of the various lipid-based formulations which may be employed in keeping with the present invention may vary as is well known to those skilled in the fat chemistry and chocolate chemistry arts; provided that the formulation is such that it is substantially solid at room temperature and has a tempering temperature in the range of 40° C. to 90° C.

A particular method and apparatus for injecting color, and possibly also flavor, into a lipid-based formulation has been developed by the inventors herein. In any event, at least one of the layers of the multi-layer, lipid-based confection will have a different color, and possibly also a different flavor, than any layer which is contiguous to it.

A typical confection which may be made in keeping with the present invention is one which comprises a chocolate first layer and a second layer which has a distinctive color and flavor that is different than chocolate. For example, the second layer might be based on an orange flavor and color, or it might have a mint flavor and a green color, and so on. Other examples may include a cheese-based first lipid-based layer and a second layer having a citrus or pineapple color and flavor. Another example is when each layer is white, dark, light, or milk chocolate.

However, in each instance, the lipid-based formulation for each layer must be such that it has the room temperature solidity characteristics and tempering characteristics discussed above, and it must also be such that it is relatively viscous so that when it is deposited onto a moving conveyor belt or onto another layer which is already in place on the moving conveyor belt, there is no substantial flow of the lipid-based formulation of that layer then being deposited.

This may be enhanced, in part, by having the moving conveyor belt at a cooled temperature, below that at which the lipid-based formulation is being placed; or by passing the already placed ribbon of lipid-based formulation through a cooling tunnel so as to be at a lower temperature than the temperature of the lipid-based formulation of the next layer to be deposited. As will be noted hereafter, the crosswise cross-section of a ribbon of lipid-based confection of the invention is controlled to some extent by the use of the fingers, and to some extent by controlling its viscosity. Also, in an alternative approach, the lipid-based formulation may be extruded through a series of spaced nozzles.

Typically, a base formulation for the lipid-based formulations in keeping with the present invention may be compound chocolate or white chocolate, having sugar added thereto for the purposes of sweetness.

When one of the layers is such that it is flavored with an aromatic flavoring agent such as orange oils or peppermint oils, and the like, a particularly delightful organoleptic experience for the consumer of the confection may occur.

This is because the vapor pressure of the flavoring additives such as orange or peppermint oils, and the like, is lower than the vapor pressure, of say, chocolate, thereby resulting in a more immediate release of the flavor of the second or flavored layer, followed by the release of the chocolate flavor.

A particular feature of the present invention is that the lipid-based formulations for each successive layer are tempered so that there is no crystallization in the formulation at the time that it is dispensed. Also, the lipid-based formulations are sufficiently viscous, as noted, so that no significant lateral flow of the material will occur after it has been dispensed.

It is, of course, possible that both layers of a two-layer lipid-based confection in keeping with the present invention may be based on chocolate—one layer being conventional chocolate, and the other being white chocolate. In that instance, there is a distinctive difference in the colors of the layers, and there may also be at least a discernable difference in the flavors of the layers.

SUMMARY OF THE INVENTION

Accordingly, the present invention provides both a method of manufacturing a multi-layered, laminated, lipid-based sweet confection, and a mixer for mixing a color syrup additive to a tempered, lipid-based formulation which is a formulation for at least one of the layers of the multi-layered, laminated, lipid-based sweet confection.

The method for manufacturing the multi-layered, laminated, lipid-based sweet confection provides such a confection that has a first liquid-based layer and at least a second lipid-based layer, and each of those layers has a different color than each contiguous layer.

Each lipid-based layer of the laminated confection is substantially solid at room temperature, and each lipid-based layer is formed of a lipid-based formulation having a tempering temperature in the range of 40° C. to 90° C., whereat each respective lipid-based formulation has zero crystallization regions.

The method comprises the following steps:

(a) Tempering the lipid-based formulation of the first layer, and spreading the tempered formulation at a first position onto a moving conveyor belt arranged to be moved through a cooling tunnel.

(b) Passing the spread lipid-based formulation on the conveyor belt through openings in a first plurality of fingers. The first plurality of fingers contact the conveyor belt, so as to striate the spread lipid-based formulation into a plurality of ribbons. The center-to-center distance between each adjacent pair of fingers is a fixed distance; and the width of each finger is a first predetermined width.

(c) Tempering the lipid-based formulation of the second layer, and spreading the tempered formulation over the plurality of ribbons of the first layer at a third position that is sufficiently far along the cooling tunnel from the second position, so that the lipid-based formulation of the first layer will at least have begun to crystallize.

(d) Passing the first and second layers of the lipid-based formulations on the conveyor belt through openings in a second plurality of fingers which contact the conveyor belt. The center-to-center distance between each adjacent pair of fingers is the same fixed distance; and the width of each finger is a second predetermined width which is not greater than the first predetermined width of the fingers of the first plurality of fingers. Thus, the width of each ribbon of lipid-based sweet confection that has two layers is at least as wide as the width of each ribbon following step (b), above.

(e) Continuing to move the layered ribbons from the conveyor belt through the cooling tunnel so as to continue to crystallize the lipid-based formulations to a temperature below 25° C.

The method of the present invention may also be employed so as to manufacture a multi-layered, laminated, lipid-based sweet confection that has at least three layers. Each layer, of course, has at least a different color than each contiguous layer. The method further comprises the step of:

(f) Before step (e), repeating steps (c) and (d) for each successive layer after the second layer. The predetermined width of each finger of each successive plurality of fingers is not greater than the width of each finger in the immediately preceding plurality of fingers.

A feature of the present invention is that each layer will have a different color and may have a different flavor than each contiguous layer.

Typically, but not necessarily, one of the layers of the multi-layered, laminated, lipid-based sweet confection is chocolate.

The lipid-based formulation of one of the at least two layers of the laminated, lipid-based sweet confection of the present invention, may be formed by mixing a color syrup additive with the tempered lipid-based formulation for that at least one layer.

If so, then the color syrup additive may be mixed with the tempered lipid-based formulation for the second layer as part of step (c), prior to spreading the tempered formulation over the plurality of ribbons of the first layer.

The method of the present invention may be practised such that the mixing step for the color syrup additive comprises the further steps of:

(g) Feeding the tempered lipid-based formulation for the at least one layer through a feed tube into a mixer.

(h) Injecting predetermined discrete quantities of the color syrup additive into the tempered lipid-based formulation by depositing the discrete quantities into the center of the feed tube as the tempered lipid-based formulation moves therethrough towards the mixer.

The present invention may provide that the colored syrup additive will in part add both color and flavor to the lipid-based formulation of the at least one layer.

The tempered formulation of the second layer may be spread over the plurality of the ribbons of the first layer by being dispensed from a plurality of dispensing nozzles which are located over the plurality of ribbons, and which are spaced apart by a center-to-center distance which is equal to the fixed distance which defines the center-to-center distance between each adjacent pair of fingers of each of the pluralities of fingers as they are arranged at stations along the conveyor belt.

Cooling of the multi-layered, laminated, lipid-based sweet confection in the cooling tunnel may be effected at least in part by cooling the moving conveyor belt from its bottom side.

Cooling may also be effected at least in part by pumping cool air through the cooling tunnel, in the same direction as the direction of movement of the moving conveyor belt therethrough.

Another feature of the present invention is to provide a mixer for mixing a color syrup additive to a tempered, lipid-based formulation. The mixer comprises a mixing body within which the color syrup additive is thoroughly mixed with the tempered, lipid-based formulation, together with a feed tube and an outlet leading into and away from the mixing body, respectively.

A cyclically operating pump is connected to a reservoir for the color syrup additive, and an injection port is located in the feed tube in a position so as to deposit discrete quantities of the color syrup additive into the center of the feed tube while the tempered, lipid-based formulation flows therethrough.

Thus, a plurality of spaced apart discrete quantities of the color syrup additive are axially located in the flowing lipid-based formulation as it enters the mixing body through the feed tube.

Moreover, the lipid-based formulation will then be evenly colored by the color syrup additive as it exits the mixing body at the outlet tube.

Typically, the mixer of the present invention has a mixing body which is cylindrical, and it comprises a plurality of fingers that are directed radially inwardly from the circumference of the mixing body, and a plurality of interposed circular discs each having a diameter less than the diameter of the mixing body being mounted axially along the length of the mixing body.

Also, the mixer of the present invention may comprise a mixing body that is a jacketed ribbon blender.

Typically, the cyclically operating pump is a proportional pump.

BRIEF DESCRIPTION OF THE DRAWINGS

The novel features which are believed to be characteristic of the present invention, as to its structure, organization, use and method of operation, together with further objectives and advantages thereof, will be better understood from the following drawing in which a presently preferred embodiment of the invention will now be illustrated by way of example. It is expressly understood, however, that the drawing is for the purpose of illustration and description only and is not intended as a definition of the limits of the invention. Embodiments of this invention will now be described by way of example in association with the accompanying drawing in which.

DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 6:
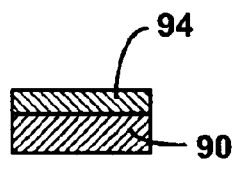
FIGS. 6, 7, and 8, show differing cross-sections of multi-layered, laminated, lipid-based sweet confections in keeping with the present invention, each having two layers.
Figure 7:
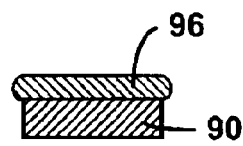
Figure 8:
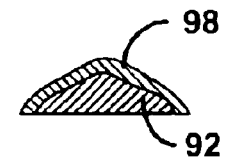

Turning first to FIGS. 6, 7, and 8, typical cross-sections of typical multi-layered, laminated, lipid-based sweet confections in keeping with the present invention, are shown. In each case, the laminated, lipid-based sweet confection comprises a first or lower layer 90 or 92. Each laminated, lipid-based sweet confection has a second layer 94, 96, or 98, respectively.

It will be noted that in the laminated, lipid-based sweet confection of FIG. 6, the width of each of the first and second layers 90 and 94 is substantially equal one to the other. However, the width of the second layer 96 as it is shown in FIG. 7, is greater than the width of the first layer 90. Also, it will be seen in FIG. 8 that the thickness of the first layer 92 is not uniform, as it is in FIGS. 6 and 7. Rather, that first layer 92 is somewhat triangular in configuration, being higher in the center than at the edges thereof. The thickness of the second layer 98 is essentially uniform, in the embodiment shown.

Figure 1:
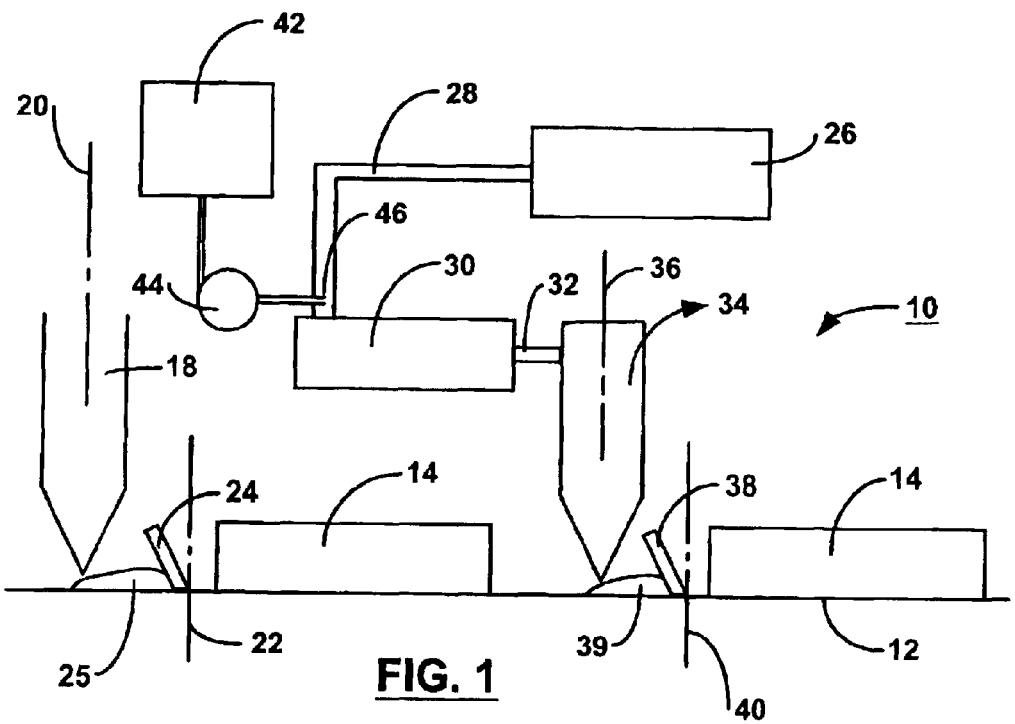
FIG. 1 is a schematic view showing a typical arrangement of a manufacturing conveyor belt line on which multi-layered, laminated, lipid-based confections in keeping with the present invention are manufactured.

Turning now to FIG. 1, some of the essential elements for a processing line for carrying out the method for manufacturing multi-layered, laminated, lipid-based sweet confections in keeping with the present invention, are shown. They comprise, for example, a moving conveyor belt 12 which moves through a cooling tunnel 14. However, it will be noted that there is a gap 16 in the cooling panel, for reasons that are described hereafter.

A first depositing spreader 18 is located over the moving conveyor belt 12, at a first position indicated at 20. At a second position 22, which is quite near, but downstream from, the first position 20, a first plurality of fingers 24 is located, and each of the fingers is arranged so as to contact the conveyor belt 12 at the second position 22. Thus, as will be noted hereafter, the layer of lipid-based sweet confection formulation which is placed onto the conveyor belt 12 at the position 20 is striated or formed into ribbons on the conveyor belt 12, by being effectively extruded through the openings between the plurality of fingers, as discussed below, at the time that the moving conveyor 12 passes under the plurality of fingers at the second position 22.

As the material from the first depositing spreader 18 is placed on the moving conveyor belt 12, it extrudes through the openings between the plurality of fingers, and there is some build-up of the lipid-based confection formulation in the region behind the fingers 24, as shown at 25.

Figure 3:
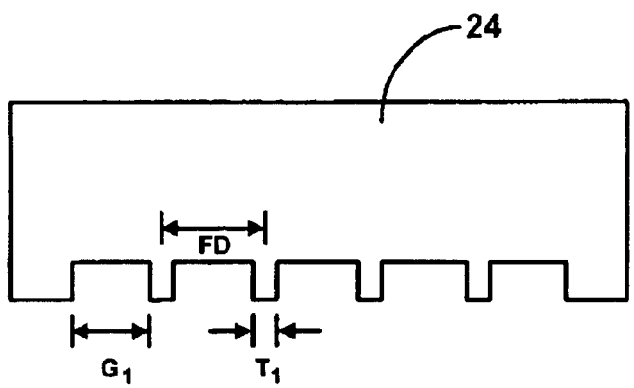
FIG. 3 illustrates a first set of a plurality of teeth which are used as part of the apparatus of the present invention.

With reference to FIG. 3, it will be seen that the center-to-center distance between each adjacent pair of fingers is fixed, and is shown as the distance $F_D$. The width of each of the fingers is shown as $T_1$; and the distance between adjacent pairs of fingers is shown as $G_1$. Obviously, the fixed distance $F_D$ is equal to $G_1$ plus $T_1$.

The tempered lipid-based formulation which is deposited on the moving conveyor belt 12 at the first position 20 is fed to the depositing nozzle or spreader 18 from a tempering and storage unit, not shown.

However, a similar tempering and storage unit for a lipid-based formulation for a second layer is shown at 26. The nature of tempering and storage units for lipid-based formulations which are such as to be substantially solid at room temperature and to have a tempering temperature in the range of 40° C. to 90° C., is well known to those skilled in the relevant chocolate or other lipid-based or fat chemistries.

For purposes to be described hereafter, the lipid-based formulation for the second layer to be deposited on the multi-layered, laminated, lipid-based sweet confection in keeping with the present invention at a third position 36, is fed through a feed tube 28 to a mixer 30, and from the mixer 30 through an outlet tube 32 towards a second depositing nozzle or spreader 34. It will be seen that the second depositing nozzle or spreader 34 is located within the gap 16 formed in the cooling tunnel 14.

Also, located at a fourth position 40, which is downstream from the third position 36, there is a second plurality of fingers 38, which also contact the moving conveyor belt 12. Thus, a second build-up of the second lipid-based confection formulation is formed in the region behind the second plurality of fingers 38, as shown at 39.

Figure 4:
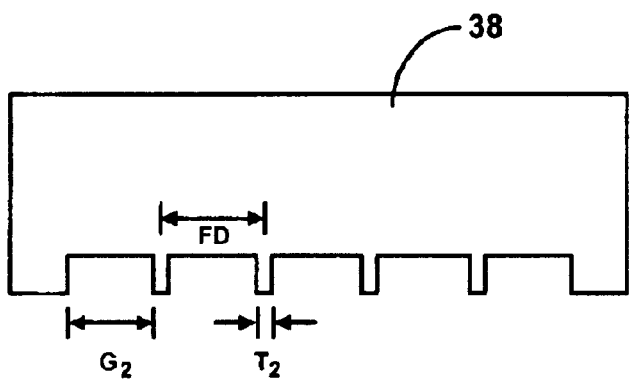
FIG. 4 shows a second set of a plurality of teeth similar to FIG. 3

As seen in FIG. 4, the center-to-center distance between each adjacent pair of fingers is the same fixed distance $F_D$. However, the width of each finger on the plurality of fingers 38 is shown at $T_2$, and the distance between the fingers is shown at $G_2$. Obviously, the sum of $G_2$ and $T_2$ is equal to the fixed distance $F_D$.

However, the width $T_2$ of each of the second plurality of teeth 38 is not greater than the width $T_1$ of the teeth of the first plurality of teeth shown at 24. That is to say, $T_1$ may equal $T_2$, or be greater than $T_2$, but never less than $T_2$.

Accordingly, as will be seen hereafter, as the plurality of ribbons R moves past the second plurality of teeth 38, and the second layer is effectively extruded through the fingers of the second plurality of fingers 38 onto the first extruded layer of the ribbons R, in a cross-section may have any one of those shown in FIGS. 6, 7 or 8. I should be noted that in each instance the width of the second layer 94, 96 or 98, is at least as great or greater than the width of the first layer 90, 90 or 92, respectively.

Also associated with the mixer 30 is a reservoir 42 for a color syrup additive which is to be mixed with the lipid-based formulation being fed from the tempering unit and storage unit 26 through the feed tube 28. A cyclically operating pump 44 is connected to the reservoir 42 for the color syrup additive, and it has an injection port 46 which is located in the feed tube 28 in such a position as to deposit discrete quantities of color syrup additive into the center of the feed tube while the lipid-based formulation from the tempering unit and storage unit 26 flows through the feed tube 28, all in a manner to be described hereafter.

Figure 5:
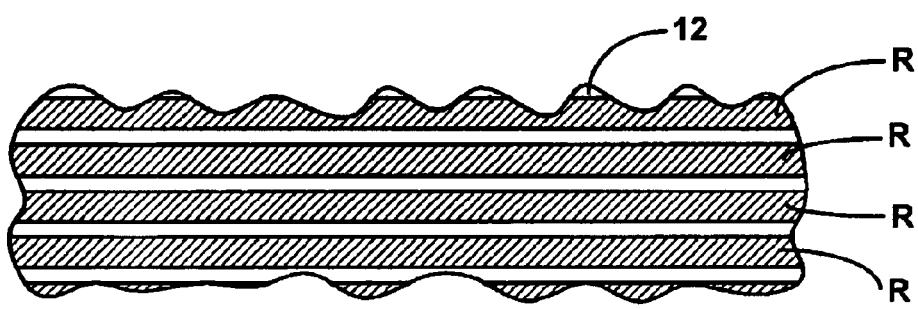
FIG. 5 is a top view of a portion of a conveyor belt having a plurality of ribbons of lipid-based sweet confection placed thereon.

FIG. 5 illustrates a portion of a moving conveyor belt 12, having a plurality of ribbons R of lipid-based sweet confection deposited thereon. The striations or ribbon-like arrangement of the deposited lipid-based sweet confection is clearly understood from FIG. 5, after the moving conveyor belt has passed under either of the sets of teeth 24 or 38.

The method of manufacturer a multi-layered, laminated, lipid-based sweet confection in keeping with the present invention will now clearly be understood.

Each lipid-based layer is such that it is made from a formulation that is substantially solid at room temperature. However, the lipid-based formulation for each layer is also such that it has a tempering temperature in the range of 40° C. to 90° C., so that at the tempering temperature there is zero crystallization. It will be understood, therefore, that the formulations for each layer are laid down at the respective stations 20 and 36, and other stations if such exist further beyond station 36 along the moving conveyor belt 12, while they are still in their tempered, uncrystalized, condition. Re-crystallization of the formulations occurs after they have been deposited.

Thus, the lipid-based formulation for the first layer is tempered, and is spread at the first position 20 onto the moving conveyor belt 12. Then, the tempered formulation—which, by then, may have begun to re-crystallize—is moved below the first plurality of fingers 24 so as to extrude through the openings between the fingers. Thus, the spread lipid-based formulation is striated or effectively extruded into a plurality of ribbons R. Clearly, the center-to-center distance between the ribbons R or between the adjacent spaces between the ribbons, is the fixed distance $F_D$.

After the tempered lipid-based formulation for the second layer is spread at position 36, it extrudes past the second plurality of fingers 38. However, at position 36 the lipid-based formulation of the first layer which was laid down at position 20 will and extruded past the fingers 24 at position 22, at least have begun to crystallize, by the time it reaches position 40. Thus, its side-to-side dimension on the moving conveyor belt 12 will have been stabilized. This is further controlled by controlling the viscosity of the lipid-based formulation so that it is relatively highly viscous at the time when it is first laid onto the moving conveyor belt 12, in any event.

Accordingly, it will be understood that the spacing $G_2$ between the fingers of the second plurality of fingers 38, is at least as great as or may be greater than the spacing $G_1$ of the first plurality of fingers 24. Thus, it will be clear that the width $T_2$ of the fingers of the second plurality of fingers 38 is not greater than the width $T_1$ of the fingers of the first plurality of fingers 24. This assures that there is no damage done to the edges of the first layer of lipid-based formulation that has been laid down, since it will already have begun to crystalize.

However, it will also be understood that the amount of cooling and the amount of crystallization of the first layer will not have been so great as to cause the layer to completely set up and become hard. Put in other words, there will still remain at least a surface tackiness of the first layer of the lipid-based formulation as the second layer of another lipid-based formulation is placed over it.

Finally, it will be understood that the ribbons that have been placed onto the moving conveyor belt 12 as it passes through the cooling tunnel 14 are permitted to continue to cool and crystalize the respective lipid-based formulations of the multiple layers of the laminated confection, by cooling them to a temperature below 25° C.

In the event that the multi-layered, laminated, lipid-based sweet confection has at least three layers, and each layer has at least a different color than each contiguous layer, then the method will further comprise the step of:

(f) Before step (e), noted above, repeating each of steps (c) and (d) for each successive layer after the second layer. Obviously, the predetermined width of each finger of each successive plurality of fingers must not be greater than the width of each finger in the immediately preceding plurality of fingers.

Of course, each layer may not only have a different color, but it may have a different flavor, and usually does, than that of each contiguous layer.

It has also been noted that quite frequently one of the layers of the multi-layered, laminated, lipid-based sweet confection is chocolate.

Where one of the layers has a different color than the other, the different color may be achieved by mixing a color syrup additive with the tempered lipid-based formulation for that at least one layer.

If so, then typically the color syrup additive is mixed with the tempered lipid-based formulation for the layer—usually the second layer—as part of step (c) which has been noted above, prior to spreading the tempered formulation over the plurality of ribbons of the first layer.

That mixing step is carried out in the following manner:

First, the tempered lipid-based formulation for the layer—typically the second layer—is fed from its respective tempering and storage unit 26 through a feed tube 28 into a mixer 30.

At the same time, predetermined discrete quantities of color syrup additive are injected into the tempered lipid-based formulation flowing through the feed tube 28, by depositing the discrete quantities center of the feed tube as the tempered lipid-based formulation moves therethrough towards the mixer.

Figure 2:
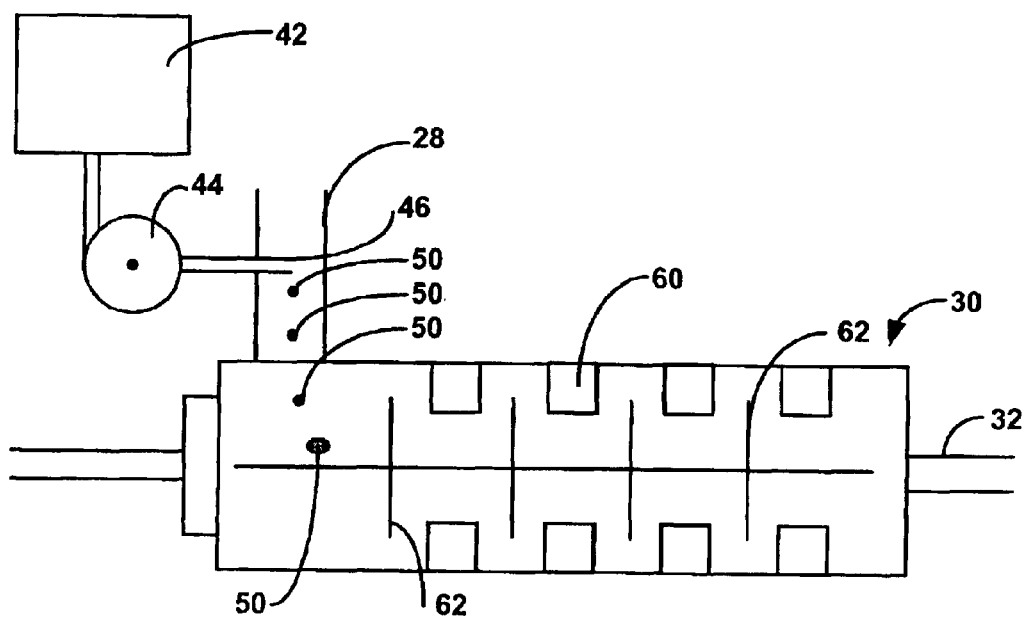
FIG. 2 is a schematic view of a typical mixer configuration in keeping with the present invention.

Reference is made to FIG. 2. Here it is seen that the tempered formulation from the tempering and storage unit 26 is fed downwardly in a continuous stream through the feed tube 28 into the mixing body 30. However, an injection port 46 is placed into the feed tube 28 in such a manner and position that discrete quantities of color syrup additive can be deposited into the center of the feed tube 28 while the lipid-based formulation flows therethrough. The discrete quantities are shown effectively as drops or globules 50; and it will be understood that as the drops or globules 50 enter the mixing body 30 together with the lipid-based formulation with which they are to be mixed, they begin mixing into the formulation and lose their integrity as they become mixed and impart their color to the lipid-based formulation.

As noted, the color syrup additive may also impart a flavor as well as color to the lipid-based formulation. Such flavor may typically be a citrus flavor, peppermint, or the like.

In order to achieve the cross-section of ribbons R as shown in FIG. 8, the lipid-based formulation for the layers 92 and 98 may be placed by being dispensed by a plurality of dispensing nozzles, and by controlling the viscosity of the lipid-based formulation so that it exhibits a limited but controlled flow characteristic as it is first deposited into the moving conveyor belt 12. Particularly, the lipid-based formulation for the layer 98 may be dispensed from a plurality of dispensing nozzles which are, of course, aligned with the ribbons R and their relationship to the plurality of fingers 24, 38, etc.

Cooling for the cooling tunnel may be effected at least in part by cooling the moving conveyor belt 12 from the bottom side thereof. This provides for "bottom-up" cooling of the tempered, lipid-based formulations as they are placed onto the cooling belt.

Cooling may also be effected by pumping cool air through the cooling tunnel 14, usually in the same direction as the direction of movement of the moving conveyor belt—from left to right as seen in FIG. 1.

The structure of the mixer for mixing the color syrup additive which will add color and perhaps also flavor to a lipid-based formulation, in keeping with the present invention, is described particularly with reference to FIG. 2. Here, the mixer comprises the mixing body 30, within which the color syrup additive is thoroughly mixed with the tempered, lipid-based formulation. There is also the feed tube 28, and an outlet tube 32 which lead into and away from the mixing body 30, respectively.

The cyclically operating pump 44 is connected to the reservoir 42 for the color syrup additive; and the injection port 46 is located in the feed tube 28 in a position so as to deposit discrete quantities 50 of color syrup additive into the center of the feed tube while the tempered, lipid-based formulation flows therethrough.

Thus, a plurality of spaced apart discrete quantities of color syrup additive, as shown at 50, are axially located in the flowing lipid-based formulation as it enters into the mixing body 30 through the feed tube 28.

The action of the mixer is, of course, such that the color syrup additive will be evenly mixed into the lipid-based formulation as it exits the mixing body 30 at the outlet tube 32.

The construction of the mixer may be such that the mixing body is cylindrical, and it may comprise a plurality of fingers 60 which are directed radially inwardly from the circumference of the mixing body 30, together with a plurality of cylindrical circular discs 62 which are mounted axially along the length of the mixing body. Of course, the diameter of each of the discs 62 is less than the diameter of the mixing body 30.

The mixing body 30 may also be a jacketed ribbon blender, of the sort well known to the chocolate industry, in particular.

Also, typically the cyclically operating pump 44 is a proportional pump, whereby the predetermined amount for each drop or globule 50 may be precisely controlled.

There has been described a method of manufacturing a multi-layered, laminated, lipid-based sweet confection, and an apparatus for making the laminated confection, together with a specific mixer by which color and possibly also flavor may be added to a lipid-based formulation for one or other of the layers of the laminated, lipid-based confection.

The characteristics of the lipid-based formulation have been described, and the various elements of the manufacturing line on which the multi-layered, laminated, lipid-based sweet confections in keeping with the present invention may be manufactured, have also been described in sufficient detail as a number of those elements are well known to those skilled in the art.

Other modifications and alterations may be used in the design and manufacture of the apparatus of the present invention without departing from the spirit and scope of the accompanying claims.

The use of the phrase "substantially solid" as it is used throughout the disclosure and claims is intended to convey the meaning that the lipid-based formulation exhibits the characteristics of solidity, at least by demonstrating dimensional stability without a tendency to spread or run, at room temperature.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An apparatus for adding a color syrup additive to a first tempered, lipid-based formulation, comprising:

a storage tank for containing said first tempered lipid-based formulation;

a mixing body for mixing said color syrup additive into said first tempered, lipid-based formulation to form a mixture, said mixing body having an outlet tube for said mixture;

a feed tube coupled to said storage tank for feeding said first tempered lipid-based formulation into said mixing body in a continuous stream;

a reservoir for said color syrup additive;

an injection port located at a position within the interior of said feed tube so as to be surrounded by said tempered lipid-based formulation as it flows into said mixing body; and a pump configured to operate cyclically connected to said reservoir to intermittently supply said color syrup additive from said reservoir to said injection port as said first tempered, lipid-based formulation flows through said feed tube so as to deposit discrete quantities of said color syrup additive into said continuous stream of said tempered, lipid-based formulation whereby a plurality of spaced apart discrete quantities of said color syrup additive are axially located in said continuous stream of lipid-based formulation as it enters said mixing body through said feed tube;

said mixing body including means for ensuring said mixture is evenly colored as it exits said mixing body at said outlet tube; and wherein said mixing body is cylindrical, and comprises a plurality of fingers directed radially inwardly from the circumference thereof, and a plurality of interposed circular discs each having a diameter less than the diameter of the mixing body mounted axially along the length of the mixing body.

2. An apparatus for adding a color syrup additive to a first tempered, lipid-based formulation, comprising:

a storage tank for containing said first tempered lipid-based formulation;

a mixing body for mixing said color syrup additive into said first tempered, lipid-based formulation to form a mixture, said mixing body having an outlet tube for said mixture;

a feed tube coupled to said storage tank for feeding said first tempered lipid-based formulation into said mixing body in a continuous stream;

a reservoir for said color syrup additive;

an injection port located at a position within the interior of said feed tube so as to be surrounded by said tempered lipid-based formulation as it flows into said mixing body; and a pump configured to operate cyclically connected to said reservoir to intermittently supply said color syrup additive from said reservoir to said injection port as said first tempered, lipid-based formulation flows through said feed tube so as to deposit discrete quantities of said color syrup additive into said continuous stream of said tempered, lipid-based formulation whereby a plurality of spaced apart discrete quantities of said color syrup additive are axially located in said continuous stream of lipid-based formulation as it enters said mixing body through said feed tube;

said mixing body including means for ensuring said mixture is evenly colored as it exits said mixing body at said outlet tube;

a conveyor;

a first spreader for spreading a second lipid-based formulation on said conveyor;

a extruder for striating said second lipid-based formulation into a plurality of ribbons;

a cooling tunnel for cooling said striated second lipid-based formulation;

a second spreader downstream of said cooling tunnel for dispensing said first lipid-based formulation after said first lipid-based formulation has passed through said mixing body onto said striated second lipid-based formulation; and a second extruder for striating said first lipid-based formulation into a plurality of ribbons overlying said respective ribbons of said second lipid-based formulation.

3. The apparatus of claim 2, wherein said mixing body is a jacketed ribbon blender.

4. The apparatus of claim 2, wherein said pump configured to operate cyclically is a proportional pump.

5. The apparatus of claim 2, wherein said injection port is centrally located within said feed tube.

6. The apparatus of claim 2, wherein said first and second extruders each comprise a plurality of fingers contacting said conveyor, said fingers of said second extruder being aligned with corresponding fingers of said first extruder.

7. The apparatus of claim 6, wherein said fingers of said second extruder are narrower than the fingers of said first extruder.

8. The apparatus of claim 6, further comprising a cooling tunnel downstream of said second extruder.

* * * * *